(12) United States Patent
Kawai et al.

(10) Patent No.: US 9,964,930 B2
(45) Date of Patent: May 8, 2018

(54) CONTROL DEVICE FOR CONTROLLING FACILITY EQUIPMENT

(75) Inventors: Seiji Kawai, Kusatsu (JP); Nanae Kinugasa, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 593 days.

(21) Appl. No.: 14/128,171

(22) PCT Filed: Apr. 26, 2012

(86) PCT No.: PCT/JP2012/061215
§ 371 (c)(1),
(2), (4) Date: Dec. 20, 2013

(87) PCT Pub. No.: WO2013/001903
PCT Pub. Date: Jan. 3, 2013

(65) Prior Publication Data
US 2014/0114441 A1    Apr. 24, 2014

(30) Foreign Application Priority Data

Jun. 30, 2011  (JP) .................................. 2011-146755

(51) Int. Cl.
*G05D 3/12*      (2006.01)
*G05B 13/02*     (2006.01)
(Continued)

(52) U.S. Cl.
CPC ............ *G05B 13/02* (2013.01); *F24F 11/006* (2013.01); *H02J 3/14* (2013.01);
(Continued)

(58) Field of Classification Search
CPC .... G06Q 10/04; G06Q 10/06; G06Q 30/0202; G06Q 30/0206; G05B 17/02;
(Continued)

(56) References Cited

U.S. PATENT DOCUMENTS

| 8,838,282 B1 * | 9/2014 | Ratliff ................. H02J 13/0013 |
|---|---|---|
| | | 700/19 |
| 2003/0055677 A1 * | 3/2003 | Brown .................... G06Q 30/06 |
| | | 700/291 |

(Continued)

FOREIGN PATENT DOCUMENTS

| JP | 2002-271981 A | 9/2002 |
|---|---|---|
| JP | 2007-139213 A | 6/2007 |

(Continued)

OTHER PUBLICATIONS

International Preliminary Report of corresponding PCT Application No. PCT/JP2012/061215.

(Continued)

*Primary Examiner* — Darrin Dunn
(74) *Attorney, Agent, or Firm* — Global IP Counselors, LLP

(57) ABSTRACT

The control device controls facility equipment and includes a receiving unit, first and second decision units and an adjustment control unit. The receiving unit receives time-of-use unit price information of an energy supplied to the facility equipment. The first decision unit decides a first time slot in which an index that includes a factor of an energy unit price approaches a peak in a first period based on the time-of-use unit price information. The second decision unit decides a second time slot prior to the first time slot and a third time slot subsequent to the first time slot in the first period. The adjustment control unit executes an energy adjustment control to adjust an energy consumption of the facility equipment so that an amount of suppression of the energy consumption is higher in the first time slot than in the second and the third time slots.

12 Claims, 11 Drawing Sheets

(51) Int. Cl.
*F24F 11/00* (2018.01)
*H02J 3/14* (2006.01)

(52) U.S. Cl.
CPC . *F24F 2011/0075* (2013.01); *H02J 2003/146* (2013.01); *Y02B 70/3225* (2013.01); *Y02B 70/3275* (2013.01); *Y04S 20/222* (2013.01); *Y04S 20/224* (2013.01); *Y04S 20/244* (2013.01)

(58) Field of Classification Search
CPC .... G05B 15/02; H02J 2003/007; Y04S 10/54; Y04S 20/222; Y04S 20/224; Y04S 20/242; Y04S 20/44; Y02B 60/142; Y02B 60/144
See application file for complete search history.

(56) References Cited

U.S. PATENT DOCUMENTS

| | | | | |
|---|---|---|---|---|
| 2003/0233201 A1* | 12/2003 | Horst | .................. | H02J 3/14 700/295 |
| 2005/0102068 A1* | 5/2005 | Pimputkar | ................ | H02J 3/14 700/291 |
| 2007/0244604 A1* | 10/2007 | McNally | ................ | G06Q 50/06 700/291 |
| 2008/0114499 A1* | 5/2008 | Hakim | ..................... | H02J 3/32 700/291 |
| 2008/0281473 A1* | 11/2008 | Pitt | ........................ | G06Q 30/02 700/291 |
| 2009/0132070 A1* | 5/2009 | Ebrom | ................... | D06F 39/005 700/90 |
| 2009/0309756 A1* | 12/2009 | Mason, Jr. | ........... | G01D 4/004 340/870.02 |
| 2010/0131117 A1* | 5/2010 | Mattiocco | .............. | G06Q 10/06 700/295 |
| 2010/0138363 A1* | 6/2010 | Batterberry | ........... | G06Q 10/04 705/412 |
| 2011/0125337 A1* | 5/2011 | Zavadsky | .............. | G06F 1/263 700/291 |
| 2011/0153110 A1* | 6/2011 | Drake | ................. | A47L 15/0047 700/296 |
| 2011/0251730 A1* | 10/2011 | Pitt | ........................ | G06Q 30/02 700/291 |
| 2011/0270452 A1* | 11/2011 | Lu | ........................ | G05B 19/042 700/291 |
| 2012/0095609 A1* | 4/2012 | Wetzel | .................. | G06Q 50/06 700/296 |
| 2012/0101651 A1* | 4/2012 | Haynes | .................... | H02J 3/14 700/295 |
| 2012/0158603 A1* | 6/2012 | Ameling | ................ | G06Q 10/06 705/317 |
| 2012/0239595 A1 | 9/2012 | Kiuchi et al. | | |
| 2013/0096857 A1* | 4/2013 | Chakradhar | .......... | G01D 4/002 702/61 |
| 2015/0033237 A1* | 1/2015 | Piazza | .................. | G06F 9/4881 718/102 |

FOREIGN PATENT DOCUMENTS

JP   2011-120323 A      6/2011
WO   WO 2011065494 A1 *  6/2011  ............. G06Q 50/06

OTHER PUBLICATIONS

European Search Report of corresponding EP Application No. 12 80 3871.8 dated Apr. 28, 2015.
International Search Report of corresponding PCT Application No. PCT/JP2012/061215 dated Jul. 31, 2012.

* cited by examiner

FIG. 4

| TYPE OF TIME SLOT | MAXIMUM PERMISSIBLE OPERATING CAPACITY (%) |
| --- | --- |
| FIRST TIME SLOT | 40 |
| SECOND TIME SLOT | 80 |
| THIRD TIME SLOT | 60 |

FIG. 5

| STARTING TIME | ENDING TIME | TYPE OF TIME SLOT | MAXIMUM PERMISSIBLE OPERATING CAPACITY (%) | ENERGY CONSUMPTION (kwh) |
| --- | --- | --- | --- | --- |
| ... | ... | ... | ... | ... |
| MAY 1 9:00 | MAY 1 13:00 | SECOND TIME SLOT | 80 | 240 |
| MAY 1 13:00 | MAY 1 16:00 | FIRST TIME SLOT | 40 | 120 |
| MAY 1 16:00 | MAY 2 9:00 | THIRD TIME SLOT | 60 | 780 |
| MAY 2 9:00 | MAY 2 13:00 | SECOND TIME SLOT | 80 | 250 |
| ... | ... | ... | ... | ... |

FIG. 6

| TIME / COMPANY NAME | 9:00-10:00 | 10:00-13:00 | 13:00-16:00 | 16:00-18:00 | 18:00-21:00 | 21:00-9:00 |
| --- | --- | --- | --- | --- | --- | --- |
| CHEAPEST UNIT PRICE (¥/kwh) | 12 | 20 | 25 | 20 | 12 | 10 |
| COMPANY OFFERING CHEAPEST UNIT PRICE | T | S | S | S | T | T |

FIG. 7

| TIME | PREDICTED ENERGY CONSUMPTION (kWh) |
|---|---|
| 9:00~10:00 | 50 |
| ... | ... |
| 12:00~13:00 | 70 |
| 13:00~14:00 | 100 |
| 14:00~15:00 | 100 |
| 15:00~16:00 | 80 |
| ... | ... |
| 8:00~9:00 | 40 |

FIG. 8

| TIME | PREDICTED ENERGY COST (¥) |
|---|---|
| 9:00~10:00 | 600 |
| ... | ... |
| 12:00~13:00 | 1400 |
| 13:00~14:00 | 2000 |
| 14:00~15:00 | 2000 |
| 15:00~16:00 | 1600 |
| ... | ... |
| 8:00~9:00 | 480 |

| TIME<br>COMPANY NAME | 9:00-<br>10:00 | 10:00-<br>13:00 | 13:00-<br>16:00 | 16:00-<br>18:00 | 18:00-<br>21:00 | 21:00-<br>9:00 |
|---|---|---|---|---|---|---|
| POWER COMPANY S (¥/kwh) | 15 | 20 | 25 | 20 | 15 | 12 |
| POWER COMPANY T (¥/kwh) | 12 | 25 | 30 | 25 | 12 | 10 |
| CHEAPEST PRICE | 12 | 20 | 25 | 20 | 12 | 10 |
| COMPANY OFFERING CHEAPEST PRICE | T | S | S | S | T | T |

FIG. 9

| TYPE OF TIME SLOT | STARTING TIME | ENDING TIME |
|---|---|---|
| SECOND TIME SLOT | 9:00 | 13:00 |
| FIRST TIME SLOT | 13:00 | 16:00 |
| THIRD TIME SLOT | 16:00 | 9:00 |

FIG. 10

| TYPE OF TIME SLOT | ENERGY CONSUMPTION (kW) |
|---|---|
| FIRST TIME SLOT | 20 |
| SECOND TIME SLOT | 60 |
| THIRD TIME SLOT | 40 |

FIG. 13A

| TYPE OF TIME SLOT | AMOUNT OF ENERGY ADJUSTMENT (kWh) |
|---|---|
| FIRST TIME SLOT | 20 |
| SECOND TIME SLOT | 60 |
| THIRD TIME SLOT | 40 |

FIG. 13B

| TYPE OF TIME SLOT | NUMBER OF UNITS IN UTILIZATION (UNITS) |
|---|---|
| FIRST TIME SLOT | 20 |
| SECOND TIME SLOT | 60 |
| THIRD TIME SLOT | 40 |

FIG. 13C

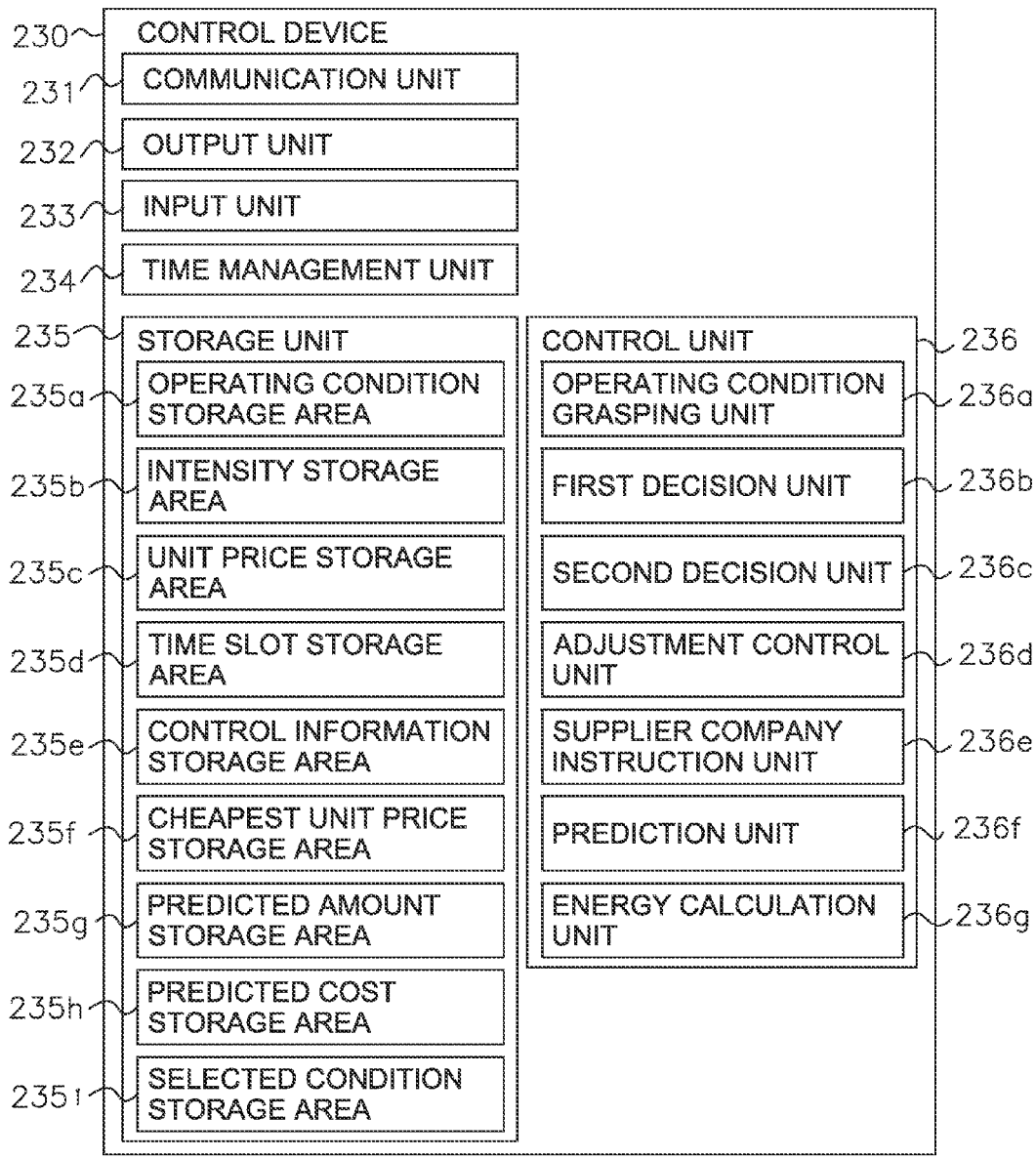

| CONDITION | MAXIMUM ENERGY CONSUMPTION FROM 9:00 TO 10:00 | DIFFERENCE BETWEEN PREVIOUS DAY VALUE AND MAXIMUM ENERGY CONSUMPTION FROM 9:00 TO 10:00 |
|---|---|---|
| LOW | 80kWh | 10kWh |
| MEDIUM | 60kWh | 30kWh |
| HIGH | 40kWh | 50kWh |

CONTROL DEVICE FOR CONTROLLING
FACILITY EQUIPMENT

CROSS-REFERENCE TO RELATED
APPLICATIONS

This U.S. National stage application claims priority under 35 U.S.C. § 119(a) to Japanese Patent Application No. 2011-116755, filed in Japan on Jun. 30, 2011, the entire contents of which are hereby incorporated herein by reference.

TECHNICAL FIELD

The present invention relates to a control device for controlling facility equipment.

BACKGROUND ART

Recent years, it is becoming increasingly common that energy suppliers encourage a plurality of premises of users to suppress the energy consumption in the time of high energy demand for more efficient operation of energy supply facilities.

For example, in actual practice, energy suppliers adopt a scheme to notify the premises of time-of-use energy unit price (JP-A No. 2007-139213). This scheme motivates the users to suppress the energy consumption in the time of high energy demand.

SUMMARY

Technical Problem

However, in cases where the energy unit price is notified, if the users place excessive importance on reducing energy costs, comfort of the users may be impaired. Particularly, in cases where the energy consumption is suppressed excessively, the comfort of the users may be severely impaired in the peak hour of the energy unit price, when the energy consumption is encouraged to be suppressed most.

An object of the present invention is to provide a control device whereby, in cases where energy unit price is notified to users by an energy supplier, comfort of the users can be assured even during the peak hour of the energy unit price, when the energy consumption is encouraged to be suppressed most.

Solution to Problem

A control device according to a first aspect of the present invention is a control device for controlling facility equipment, which comprises a receiving unit, a first decision unit, a second decision unit, and an adjustment control unit. The receiving unit receives time-of use unit price information of an energy supplied to the facility equipment. The first decision unit decides on a first time slot in which an index that includes a factor of an energy unit price approaches to its peak in a first period on the basis of the unit price information. The second decision unit decides on a second time slot prior to the first time slot and a third time slot subsequent to the first time slot in the first period. The adjustment control unit executes energy adjustment control to adjust an energy consumption of the facility equipment so that an intensity of suppression of the energy consumption is higher in the first time slot than in the second and the third time slot.

Herein, a predetermined first period is divided into at least three types of time slots, i.e., a first time slot (a time slot in which an index that includes a factor of an energy unit price approaches to its peak), a second time slot (a time slot prior to the first time slot), and a third time slot (a time slot subsequent to the first time slot). Among the three types of time slots, the energy consumption is suppressed most strongly in the first time slot. Since the energy consumption is not suppressed in the other time slots as strongly as in the first time slot, comfort is hardly impaired even when the energy consumption is strongly suppressed in the first time slot.

The control device according to a second aspect of the present invention is the control device according to the first aspect, wherein the adjustment control unit executes the energy adjustment control to adjust the energy consumption of the facility equipment so that the intensity of the suppression of the energy consumption in the third time slot is equal to or lower than the intensity of the suppression of the energy consumption in the first time slot, and the intensity of the suppression of the energy consumption is lower in the second time slot than in the third time slot.

Herein, in the second time slot, the energy consumption is suppressed at the lowest intensity among the three types of time slots. Thus, it is highly likely that a certain level of comfort is maintained when the first time slot starts. As a result, the comfort is hardly impaired even if the energy consumption is strongly suppressed in the first time slot. Furthermore, since the energy adjustment control is executed in the third time slot at the intensity equal to or less than the intensity of the first time slot, flexible energy adjustment control is accomplished according to the degree of the comfort of the user.

The control device according to a third aspect of the present invention is the control device according to the first aspect or the second aspect, further comprising a prediction unit fir predicting the energy consumption in the first period. The first decision unit calculates a product of the energy consumption predicted by the prediction unit and the energy unit price as the index for deciding the first time slot.

Here, the time slot when the index calculated as the product of the predicted energy consumption and the energy unit price approaches to its peak, i.e., the time slot when the predicted energy cost approaches to its peak, is decided as the first time slot. Thus, the energy adjustment control is executed strongly in the time slot in which the energy cost is predicted to be highest.

The control device according to a fourth aspect of the present invention is the control device according to any of the first to third aspects, wherein the energy consumption is not suppressed in the second time slot.

Here, the energy adjustment control to suppress the energy consumption is not executed in the second time slot. Thus, the comfort of the user is readily maintained, even if the energy adjustment control is executed strongly in the first time slot.

The control device according to a fifth aspect of the present invention is the control device according to any of the first to fourth aspects, further comprising an energy calculation unit. The energy calculation unit calculates a possible amount of energy consumption adjustment when the energy adjustment control is executed based on a condition. The adjustment control unit executes the energy adjustment control corresponding to the condition.

Here, it is possible to execute the energy adjustment control after the possible amount of energy consumption adjustment is ascertained in advance.

The control device according to a sixth aspect of the present invention is the control device according to the fifth aspect, further comprising an input unit. The input unit receives input of a selection criterion. The energy calculation unit calculates the possible amounts of energy consumption adjustment based on a plurality of the conditions. The adjustment control unit decides on a single condition from among the plurality of conditions based on the selection criterion and executes the energy adjustment control corresponding to the decided single condition.

Here, a plurality of the conditions are prepared, and the user participates in the selection of the condition of the energy adjustment control. As a result, the energy adjustment control which reflects the user's intent is readily available.

The control device according to a seventh aspect of the present invention is the control device according to any of the first to sixth aspects, wherein the receiving unit receives a plurality of items of the time-of-use unit price information for a period of time. The first decision unit determines a cheapest time-of-use energy unit price on the basis of the plurality of items of the unit price information for the period of time. The first time slot is decided based on the index that includes a factor of this cheapest time-of-use energy unit price.

Here, in cases where there are a plurality of energy suppliers, energy is procured from the energy supplier who offers the cheapest energy unit price for respective time. Consequently, the energy adjustment control is accomplished in the most economically advantageous manner.

Advantageous Effects of Invention

In the control device according to the first aspect of the present invention, the energy consumption is suppressed most strongly in the first time slot in which the index that includes a factor of an energy unit price approaches to its peak. Since the energy consumption is not suppressed in the other time slots as strongly as in the first time slot, it is highly likely that a certain level of comfort of the user is maintained in the first time slot. As a result, the comfort of the user is hardly impaired even if strong energy adjustment control is executed in the time slot in which the index approaches to its peak.

In the control device according to the second aspect of the present invention, in the second time slot prior to the time slot in which the index that includes a factor of an energy unit price approaches to its peak, the intensity of the energy adjustment control becomes lowest among the three types of time slots. Therefore, it is highly likely that a certain level of comfort of user is maintained when the time slot in which the index approaches to its peak starts. As a result, the comfort of the user is hardly impaired even if strong energy adjustment control is executed in the time slot in which the index approaches to its peak. Furthermore, since the intensity of the energy adjustment control executed in the time slot subsequent to the time slot in which the index approaches to its peak is equal to or lower than the intensity of the energy adjustment control in the time slot in which the index approaches to its peak, flexible energy adjustment control is accomplished according to the degree of the comfort of the user.

In the control device according to the third aspect of the present invention, strong energy adjustment control is executed in the time slot in which the energy cost is predicted to reach its peak. As a result, the energy adjustment control for reducing the energy cost is readily accomplished with assuring the comfort.

In the control device according to the fourth aspect of the present invention, the energy consumption is not suppressed in the time slot prior to the time slot in which the index that includes a factor of the energy unit price approaches to its peak. Thus, the comfort of the user is readily assured in the time slot in which the index approaches to its peak.

In the control device according to the fifth aspect of the present invention, it is possible to execute the energy adjustment control after the possible amount of energy consumption adjustment is ascertained in advance.

In the control device according to the sixth aspect of the present invention, a plurality of conditions are prepared and the user selects a condition for the energy adjustment control by him/herself. Thus, the energy adjustment control which reflects the user's demand is readily available.

In the control device according to the seventh aspect of the present invention, since energy is procured from the energy supplier which offers the cheapest energy unit price, the energy adjustment control is accomplished in the most economically advantageous manner.

BRIEF DESCRIPTION OF THE DRAWINGS

FIG. 4 is a first example of intensity of energy adjustment control, stored in an intensity storage area according to the first embodiment.

FIG. 5 is an example of information stored in a control information storage area according to the first and second embodiments.

FIG. 6 is an example of cheapest unit price information stored in a cheapest unit price storage area according to the first and second embodiments.

FIG. 7 is an example of information pertaining to the predicted hourly energy consumption, stored in a predicted amount storage area according to the first and second embodiments.

FIG. 8 is an example of information pertaining to the predicted hourly energy unit price, stored in a predicted price storage area according to the first and second embodiments.

FIG. 9 is an example of a comparison of energy unit prices, in a case where energy is supplied from a plurality of power companies according to the first and second embodiments.

FIG. 10 is an example of scheduling information stored in a time slot storage area according to the first and second embodiments.

FIG. 13A is a second example of intensity of energy adjustment control, stored in the intensity storage area according to the first embodiment, FIG. 13B is a third example of intensity of energy adjustment control, stored in the intensity storage area according to the first embodiment, and FIG. 13C is a fourth example of intensity of energy adjustment control, stored in the intensity storage area according to the first embodiment.

FIG. 15 is a simplified schematic diagram of a control device for controlling facility equipment according to the second embodiment.

FIG. 16 is an example of intensity of energy adjustment control, stored in an intensity storage area according to the second embodiment.

DESCRIPTION OF EMBODIMENTS

First Embodiment

An energy management system 100 according to a first embodiment of the present invention shall be described below with reference to the drawings.

(1) OVERALL CONFIGURATION OF ENERGY MANAGEMENT SYSTEM 100

Figure 1:
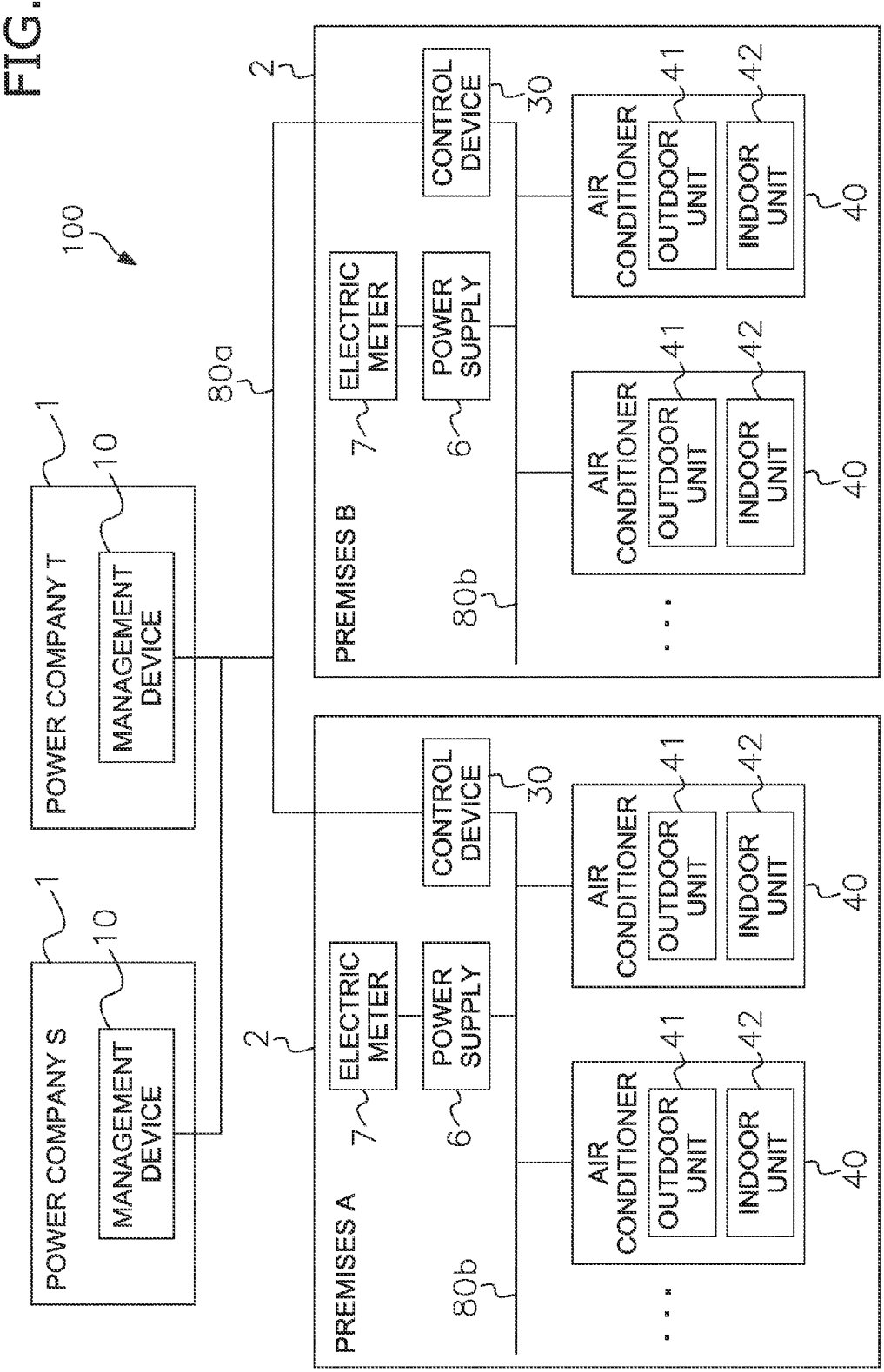
FIG. 1 is a simplified schematic diagram of the entirety of the system according to a first embodiment.

FIG. 1 shows the energy management system 100 according to the present embodiment. In this energy management system 100, power companies S, T supply energy to premises A, B. The premises A, B are structures, such as office buildings, tenant buildings, factories, ordinary residences, or the like, in which one or a plurality of pieces of facility equipment is situated. In FIG. 1, only two premises A, B are illustrated as premises that are supplied with energy by the power companies, but the number of premises is not limited to two. Moreover, although two power companies S. T are illustrated, the number of power companies is not limited to two. The number of power companies may be more than 2 or just one.

The power companies S, T have management devices 10, 10. The premises A, B have control devices 30, 30 for controlling facility equipment, air conditioners 40, 40, . . . as a plurality of facility equipment, power supplies 6, 6 for supplying power to the air conditioners 40, 40, . . . , and electric meters 7, 7 for measuring the electric energy supplied to the air conditioners 40, 40, . . . by the power supplies 6, 6. The management devices 10, 10 and the control devices 30, 30 are connected via the internet 80a. The control device 30 and the air conditioners 40, 40, . . . in the same premise are connected via a dedicated control line 80b.

The air conditioners 40, 40, . . . have outdoor units 41, 41, . . . , indoor units 42, 42, . . . , and refrigerant pipes (not illustrated) for connecting the outdoor units 41, 41, . . . and the indoor units 42, 42, . . . . The air conditioners 40, 40, . . . may be of multi type or of pair type.

Through the internet 80a, the management devices 10, 10 of the power companies S, T deliver time-of-use energy unit price information to the control devices 30, 30 at the premises A, B at predetermined time intervals (in the present embodiment, at one-day intervals). For example, at 7 AM, the management devices 10, 10 deliver time-of-use energy unit price information between 9:00 AM today and 9:00 AM tomorrow. In conjunction with the time-of-use energy unit price information, the management devices 10, 10 also deliver the name of the power company that is delivering the information to the control devices 30, 30 of the premises A, B. An energy unit price varies according to the time of use. Normally, the energy unit price is decided by the power companies S, T so that the energy unit price is higher at the time of high energy demand and the energy unit price is lower at the time of low energy demand. The power companies S, T, do not intend to coerce the premises A, B to adjust their energy consumption through delivery of the unit price information. However, delivery of the unit price information motivates the premises A, B to adjust their energy consumption.

(2) CONFIGURATIONS OF DEVICES

The management devices 10, 10 and the control device 30, 30 included in the energy management system 100 shall be described below.

(2-1) Configuration of Management Device 10

Figure 2:
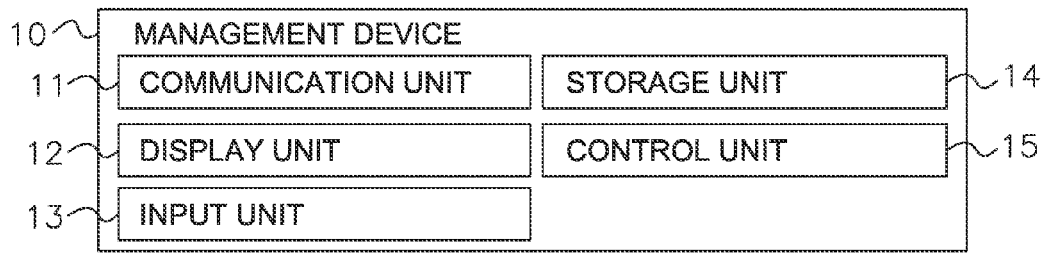
FIG. 2 is a simplified schematic diagram of a management device of a power company according to the first and a second embodiments.

FIG. 2 shows a simplified schematic diagram of the management device 10. While the management device 10 situated at the power company S shall be described below, the management device 10 situated at the power company T is comparable in configuration.

The management device 10 has a communication unit 11, a display unit 12, an input unit 13, a storage unit 14, and a control unit 15.

(2-1-1) Communication Unit 11

The communication unit 11 is a network interface to enable the management device 10 to connect to the interact 80a.

(2-1-2) Display Unit 12

The display unit 12 mainly includes a display.

(2-1-3) Input Unit 13

The input unit 13 mainly includes operation buttons, a keyboard, a mouse, and the like.

(2-1-4) Storage Unit 14

The storage unit 14 mainly includes a hard disk. The energy unit price information delivered to the premises A, B is stored in the storage unit 14. Energy unit prices may differ between the premises A, B according to their terms of the contracts.

(2-1-5) Control Unit 15

The control unit 15 mainly includes a CPU, ROM, and RAM. By loading and executing a program stored in the storage unit 14, the control unit 15 delivers time-of-use energy unit price information from the communication unit 11 to the premises A, B at predetermined time intervals (in the present embodiment, at one-day intervals).

(2-2) Configuration of Control Device 30

Figure 3:
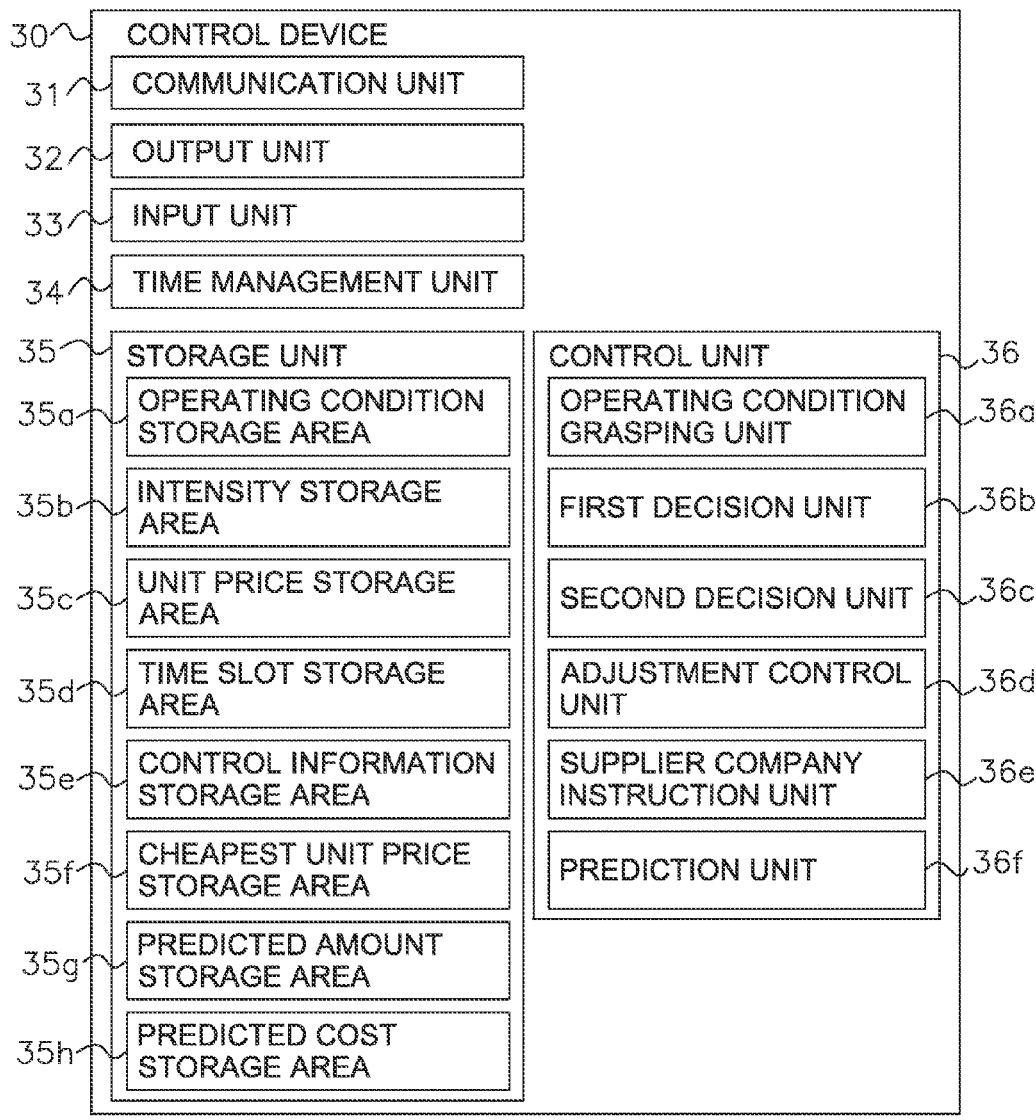
FIG. 3 is a simplified schematic diagram of a control device for controlling facility equipment according to the first embodiment.

FIG. 3 shows a simplified schematic diagram of the control device 30. While the control device 30 situated at premise A shall be described below, the control device 30 situated at premise B is comparable in configuration.

The control device 30 has a communication unit 31, an output unit 32, an input unit 33, a time management unit 34, a storage unit 35, and a control unit 36.

(2-2-1) Communication Unit 31

The communication unit 31 is a network interface mainly to enable the control device 30 to connect to the interact 80a. Through the interact 80a, the communication unit 31 receives the time-of-use energy unit price information delivered by the management devices 10, 10 of the power companies S, T, at the predetermined time intervals (in the present embodiment, at one-day intervals). The received information is stored in an after-mentioned unit price storage area 35c.

(2-2-2) Output Unit 32

The output unit 32 mainly includes a display. The output unit 32 displays screen images showing the operational status of the air conditioners 40, 40, . . . (for example, ON/OFF status of the air conditioners, operating mode (cooling mode/heating mode), airflow direction, air volume, intake temperature, and set temperature). Also displayed are, for example, predicted energy consumption and predicted energy cost which are stored in a predicted amount storage area 35g and a predicted cost storage area 35h discussed below, and/or actual energy consumption which is stored in a control information storage area 35e.

(2-2-3) Input Unit 33

The input unit 33 mainly includes operation buttons and a touch panel covering the aforementioned display. Various commands to the air conditioners 40, 40, . . . , such as start-stop signals, changes of the set temperature, changes of the operating mode, and the like, are input from the user to the air conditioners 40, 40, . . . .

(2-2-4) Time Management Unit 34

The time management unit 34 has a clock that is approximately synchronized to the management devices 10, 10 of the power companies S, T, and performs time management of various controls that are executed by the control device 30.

(2-2-5) Storage Unit 35

The storage unit 35 mainly includes a hard disk. Programs capable of being loaded and executed by the after-mentioned control unit 36 are stored in the storage unit 35. The storage unit 35 has an operating condition storage area 35a, an intensity storage area 35b, a unit price storage area 35c, a time slot storage area 35d, a control information storage area 35e, a cheapest unit price storage area 35f, a predicted amount storage area 35g and a predicted cost storage area 35h.

(2-2-5-1) Operating Condition Storage Area 35a

The operating condition storage area 35a stores the condition of the air conditioners 40, 40, . . . and the energy consumption measured by electric meter 7, which are acquired by an after-mentioned operating condition grasping unit 36a, as the operating condition. The condition of the air conditioners 40, 40, . . . includes, for example, ON/OFF status of the air conditioners, the operating mode (cooling mode/heating mode), the intake temperature, the set temperature, operating time, operating rate, and operating capacity (%) during operation. Here, "operating capacity" (%) refers to the level of capacity at which the air conditioners 40, 40, . . . (more precisely, primarily compressors) operate with respect to the rated capacity of the air conditioners 40, 40, . . . . The operating condition storage area 35a stores data including the condition of the air conditioners 40, 40, . . . and the energy consumption, together with the date and time of data acquisition.

(2-2-5-2) Intensity Storage Area 35b

The intensity storage area 35b stores intensities of the energy adjustment control for each type of time slot (the first to third time slots) decided by a first decision unit 36b and a second decision unit 36c as discussed below. Specifically, numerical values of maximum permissible operating capacity (%) for each type of time slot are stored in the intensity storage area 35b. The intensity of energy adjustment control are determined in such a way as to be the greatest in the first time slot; equal to or less than that of the first time slot in the third time slot; and the lowest in the second time slot. FIG. 4 is a drawing showing an example of the intensity of the energy adjustment control, stored in the intensity storage area 35b.

Here, "energy adjustment control" refers to operation control configured to suppress the energy consumption with respect to normal control, in consideration of an index that includes the energy unit price. The normal control refers to an operating status in which the air conditioners 40, 40, . . . are controlled, for example, on the basis of extent of divergence between the current values and the target values, for the values relating to set temperature, humidity, and the like, without consideration of the index that includes the energy unit price.

"Maximum permissible operating capacity" (%) represents the maximum operating capability of the air conditioners 40, 40, . . . (more precisely, primarily the compressors) permitted during the energy adjustment control and is expressed as a percentage of the rated capacity. During the energy adjustment control, operation at a capacity higher than this is not allowed.

"Intensity" represents the intensity of suppression of the energy consumption. For example, between an energy adjustment control to suppress the maximum permissible operating capacity to 60% and an energy adjustment control to suppress the maximum permissible operating capacity to 80%, the intensity is higher in the case of the energy adjustment control to suppress the maximum permissible operating capacity to 60%.

The values stored in the intensity storage area 35b may be fixed values that are stored in advance in the intensity storage area 35b, or values that are updateable by input of the user through the input unit 33. Alternatively, appropriate numerical values may be updated automatically on the basis of, for example, past operating conditions stored in the operating condition storage area 35a, predicted power consumption, predicted energy cost, environmental conditions, facility utilization conditions, length of each time slot, and the like. "Past operating conditions" refers to, for example, indoor temperature, humidity, lighting intensity, ventilation volume, and the like of the past. "Environmental conditions" refers to, for example, weather, outdoor temperature, brightness, and the like. "Facility utilization conditions" refers to, for example, ON/OFF status of the facility, the energy consumption, and the like.

(2-2-5-3) Unit Price Storage Area 35c

The unit price storage area 35c stores the time-of-use unit price information which is delivered by the management devices 10, 10 of the power companies and received by the communication unit 31. Since the name of the power company that delivers the unit price information is also delivered together with the unit price information, even when the unit price information from a plurality of power companies is received, it is possible to store the unit price information in such a way as to be identifiable which power company delivered the unit price.

(2-2-5-4) Time Slot Storage Area 35d

The time slot storage area 35d stores the starting time and the ending time of the first to third time slots decided by the first decision unit 36b and the second decision unit 36c discussed below.

(2-2-5-5) Control Information Storage Area 35e

The control information storage area 35e stores information relating to the execution time and the content of the energy adjustment control.

For example, as information relating to the execution time of the energy adjustment control, the starting time and ending time of previously executed energy adjustment control are stored. For example, as information relating to the content of the energy adjustment control, the type (i.e., first to third) of time slot; the maximum permissible operating capacity corresponding to the type of time slot, which is stored in the intensity storage area 35b; the actual energy consumption between the starting time and the ending time of each of the time slot, and the like are stored. FIG. 5 shows an example of information stored in the control information storage area 35e.

(2-2-5-6) Cheapest Unit Price Storage Area 35f

The cheapest unit price storage area 35f stores cheapest unit price information created by the after-mentioned first decision unit 36b, FIG. 6 shows an example of stored information. In addition to the time-of-use cheapest unit price, the name of the power company that offers the cheapest unit price is also stored. In a case where only a single power company supply energy to the premise A, the unit price information offered by that power company is stored as-is in the cheapest unit price storage area 35f.

(2-2-5-7) Predicted Amount Storage Area 35g

The predicted amount storage area 35g stores predicted energy consumption predicted for each of predetermined time intervals (in the present embodiment, each hour) of a predetermined period (in the present embodiment, one day) by an after-mentioned prediction unit 36f. FIG. 7 shows an example of the information of the predicted energy consumption.

(2-2-5-8) Predicted Cost Storage Area 35h

The predicted cost storage area 35h stores information about predicted energy cost for each of predetermined time intervals (in the present embodiment, each hour) created by the after-mentioned first decision unit 36b. FIG. 8 shows an example of the information of the predicted cost information.

(2-2-6) Control Unit 36

The control unit 36 mainly includes a CPU, ROM, and RAM. By loading and executing a program stored in the aforementioned storage unit 35, the control unit 36 functions primarily as the operating condition grasping unit 36a, the first decision unit 36b, the second decision unit 36c, the adjustment control unit 36d, a supplier company instruction unit 36e, and the prediction unit 36f, as shown in FIG. 3.

(2-2-6-1) Operating Condition Grasping Unit 36a

The operating condition grasping unit 36a acquires the condition of the air conditioners 40, 40, . . . and the energy consumption measured by the electric meter 7 as the operating condition of the air conditioners 40, 40, . . . . The condition of the air conditioners 40, 40, . . . includes, for example, ON/OFF status of the air conditioner, the operating mode (cooling mode/heating mode), the intake temperature, the set temperature, the operating time, the operating rate, and the operating capacity (%) during operation. The operating condition grasping unit 36a acquires the condition of the air conditioners 40, 40, . . . and the energy consumption through communication with the air conditioners 40, 40, . . . and the electric meter 7 at predetermined time intervals (in the present embodiment, 5-minute intervals) based on the clock time presented by the time management unit 34. The values acquired by the operating condition grasping unit 36a are stored in the aforementioned operating condition storage area 35a.

(2-2-6-2) First Decision Unit 36b

The first decision unit 36b primarily executes two processes, decision of the first time slot and calculation of the predicted energy costs.

The first time slot is decided in the following manner.

The first decision unit 36b decides on the first time slot in which an index including a factor of the energy unit price approaches to its peak in a predetermined period (in the present embodiment, one day), on the basis of the cheapest unit price information created from one or a plurality items of the time-of-use unit price information received by the communication unit 31.

The cheapest unit price information is determined by the first decision unit 36b in the following manner and is stored in the cheapest unit price storage area 35f.

In cases where a plurality of items of unit price information are provided for a given period of time, the first decision unit 36b compares the energy unit price of each of the power companies and determines the time-of-use cheapest unit price as shown in FIG. 9. When multiple power companies offer the same unit price for a period of time, one of the following methods is used for the determination. For example, it is specified in advance which of the power companies to select when multiple power companies offer the same unit price. Otherwise, the company that offers the cheapest price for the previous time period is selected successively when multiple power companies offer the same unit price. If the power company is only one, the offered unit price information is determined as the cheapest unit price information. The determined time-of-use cheapest unit price information is stored in the cheapest unit price storage area 35f together with the name of the power company which offers the cheapest unit price information, as shown in FIG. 6.

The time slot in which the index including a factor of the energy unit price approaches its peak in the predetermined period includes, for example, a single time slot in the time slots in which the energy unit prices reach their maximum in the predetermined period.

However, the index including a factor of the energy unit price is not limited to the energy unit price itself.

Further, the time slot which approaches its peak is not limited to the time slot in which the index including a factor of the energy unit price reaches its maximum. For example, the time slot which approaches its peak may be determined as a time slot in which the energy unit prices exceed a predetermined value; or a time slot of predetermined length (for example, 3 hours) that includes one or more time slots in which energy unit reach their maximum.

The method for deciding the first time slot shall be described below in specific terms, using an example of a case in which one of the time slots where the energy unit price reach its maximum in a predetermined period is determined as the first time slot. Here, it is assumed that there are multiple power companies.

Firstly, at a given time, for example at 9:00 AM, the first decision unit 36b reads out a plurality of items of the energy unit price information for a period from 9:00 AM today to 9:00 AM tomorrow present in the unit price storage area 35c. Then, the energy unit prices of the power companies are compared for each hour and a time-of-use cheapest unit price is determined as shown in FIG. 9. The determined cheapest unit price information is stored in the cheapest unit price storage area 35f in the format such as shown in FIG. 6.

Next, the first decision unit 36b decides one of the time slots in which the unit price reaches its maximum in the predetermined period as the first time slot on the basis of information stored in the cheapest unit price storage area 35f. For example, in the example of FIG. 6, there is only one time slot between 13:00 today and 16:00 today in which the energy unit price reaches its maximum in the predetermined period (the period from 9:00 AM today to 9:00 AM tomorrow). Therefore, the first decision unit 36b decides the time slot between 13:00 today and 16:00 today as the first time slot. When the first time slot is determined in this manner, in cases where the first time slot starts at the starting time of the predetermined period (in the present example, 9:00 AM today), the first time slot is determined in such a way that the starting time of the first time slot is delayed by a predetermined time interval (for example, 2 hours). This enables that a time slot (a second time slot) in which the intensity of suppression becomes the lowest is secured and makes it easy to maintain comfort during the first time slot.

Next, a process for calculating predicted energy cost, which is carried out by the first decision unit 36b, shall be described.

The first decision unit 36b calculates a product of the unit price information stored in the cheapest unit price storage area 35f and the energy consumption predicted by the after mentioned prediction unit 36f. In terms of the specific process, the first decision unit 36b reads out the unit price information stored in the cheapest unit price storage area 35f and the predicted energy consumption stored in the predicted amount storage area 35g, and calculates the product thereof for each hour.

In more specific terms, in a case where the unit price information of FIG. 6 is stored in the cheapest unit price storage area 35f and the predicted energy consumption of FIG. 7 is stored in the predicted amount storage area 35g, a table of the predicted energy cost is created as shown in FIG. 8 by multiplying the energy unit price and the energy consumption for each hour. The created information is stored in the predicted cost storage area 35h.

By outputting the predicted energy unit prices calculated in this manner to the output unit 32, it is possible for the user to recognize the predicted energy cost in advance.

Moreover, the predicted energy cost may be used as the index that includes a factor of the energy unit price when the first time slot is decided by the first decision unit 36b. In specific terms, in a case where the predicted energy cost is calculated as shown in FIG. 8, a period, for example, a time slot between 13:00 and 15:00 in which the predicted energy cost reaches its maximum is decided as the first time slot.

(2-2-6-3) Second Decision Unit 36c

The second decision unit 36c decides on a second time slot prior to the first time slot and a third time subsequent to the first time slot in the predetermined period.

For example, in a case where the predetermined period is from 9:00 AM today to 9:00 AM tomorrow and the first time slot is from 13:00 to 16:00 today, it is decided that the second time is between 9:00 today and 13:00 today and the third time slot is between 16:00 today and 9:00 tomorrow.

(2-2-6-4) Adjustment Control Unit 36d

The adjustment control unit 36d determines to which type of the time slots the current time corresponds among the first to third time slots on the basis of the current time from the time management unit 34 and the starting and ending times of the first to third time slots which are stored in the time slot storage area 35d. Then, the adjustment control unit 36d executes the energy adjustment control with the maximum permissible operating capacity stored in the intensity storage area 35b until the ending time of the determined time slot. The intensity of the energy adjustment control stored in the intensity storage area 35b satisfies the following relationship: intensity of the first time slot≥intensity of the third time slot>intensity of the second time slot.

In more specific terms, the adjustment control unit 36d functions in the following manner.

For example, in a case where the current time from the time management unit 34 is 13:00 and the information in FIG. 10 is stored in the time slot storage area 35d, the adjustment control unit 36d which has read out the information in FIG. 10 determines that the current time corresponds to the first time slot. Then, in a case where the information in FIG. 4 is stored in the intensity storage area 35b, the adjustment control unit 36d executes the energy adjustment control at a maximum permissible operating capacity of 40%. The adjustment control unit 36d then continues this energy adjustment control until 16:00, the ending time of the first time slot. After 16:00, the adjustment control unit 36d executes the determination of the time slot again, and subsequently repeats the similar process.

(2-2-6-5) Supplier Company Instruction Unit 36e

The supplier company instruction unit 36e instructs the power distribution panel (not illustrated) for each time to procure energy from the power supply company offering the cheapest price on the basis of the data stored in the cheapest unit price storage area 35f.

(2-2-6-6) Prediction Unit 36f

The prediction unit 36f predicts the energy consumption during a predetermined period (in the present embodiment, one day). In the present embodiment, a past energy consumption is used as the predicted energy consumption. The predicted energy consumption is stored in the predicted amount storage area 35g.

In specific terms, in the present embodiment, information about hourly energy consumption from 9:00 yesterday to 9:00 today is used as the predicted hourly energy consumption from 9:00 today to 9:00 tomorrow. FIG. 7 is an example of created information of the predicted energy consumption. Although FIG. 7 shows information about the predicted energy consumption on hourly basis, the energy consumption may be predicted at shorter time intervals or at longer time intervals.

The method for predicting the energy consumption is not limited to the aforementioned method. For example, the hourly energy consumption may be calculated statistically from the energy consumption over the past one week. Moreover, the energy consumption may be predicted on the basis of data such as today's weather forecast instead of the past information or in addition to the past information.

(3) CONTROL PROCESSES PERFORMED IN THE ENERGY MANAGEMENT SYSTEM 100

Figure 11:
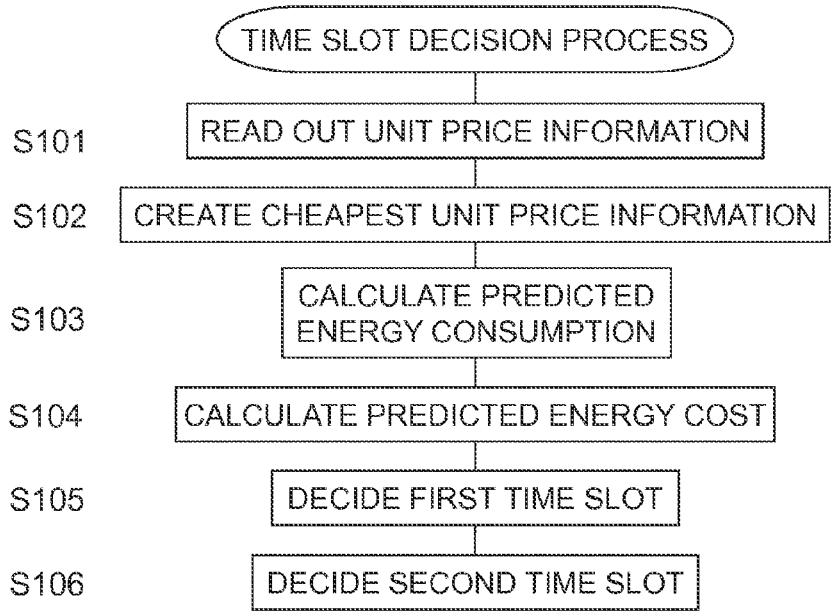
FIG. 11 is a flowchart showing the flow of decision about the type of time slot in the control device according to the first and second embodiments.
Figure 12:
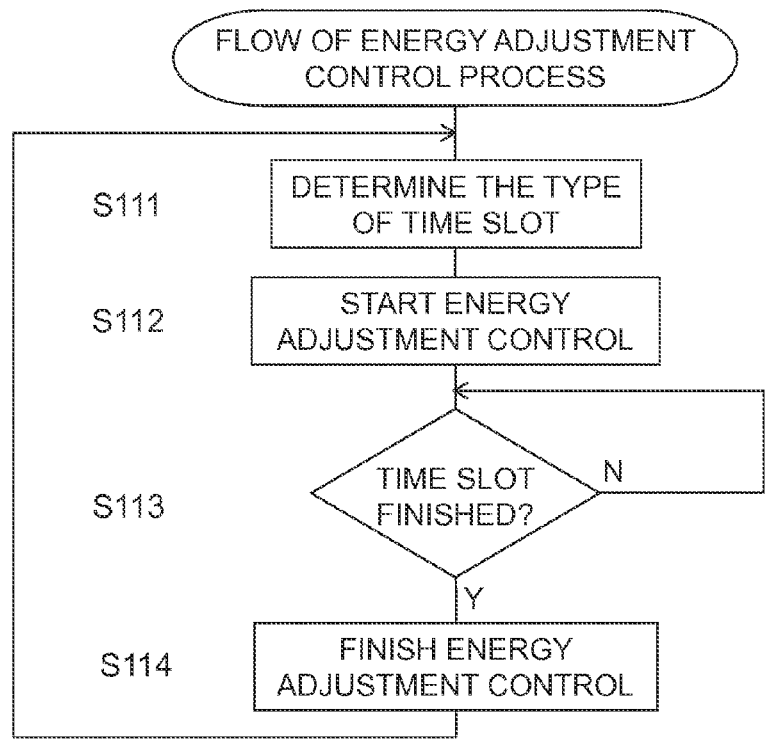
FIG. 12 is a flowchart showing the flow of the energy adjustment control process in the control device according to the first embodiment.

FIG. 11 is a flowchart showing the flow of the decision process of the type of time slot by the control device 30. FIG. 12 is a flowchart showing the flow of the energy adjustment control process by the control device 30. The processes shown in FIG. 11 and FIG. 12 are independent from each other. The flow of the processes executed by the control device 30 for controlling the air conditioners 40, 40, shall be discussed below with reference to FIG. 11 and FIG. 12.

FIG. 11 shall be described first.

In the present embodiment, Step S101 is carried out at 9:00 AM daily. In Step S101, the first decision unit 36b reads out the unit price information for the period from 9:00 AM today to 9:00 AM tomorrow from the unit price storage area 35c.

The unit price information is delivered at predetermined time intervals (in the present embodiment, one-day intervals) from the management devices 10, 10 of one or a plurality of power companies S, T, to the control device 30 at the premise A. In the present embodiment, the unit price information for the period from 9:00 AM today to 9:00 AM tomorrow is delivered at 7:00 AM. The delivered unit price information is stored in the unit price storage area 35c.

In Step S102, the first decision unit 36b compares the energy unit price offered by each power company for each time as shown in FIG. 9, and decides a time-of-use cheapest unit price on the basis of the energy unit price information read out in Step S101. In cases where there is only one power company, the delivered unit price information is decided as the cheapest unit price information. The time-of-use cheapest unit price is stored in the cheapest unit price storage area 35f together with the name of the company offering the cheapest unit price.

In Step S103, the prediction unit 36f reads out the past energy consumption from the operating condition storage area 35a and executes prediction of the energy consumption for each hour for a predetermined period (in the present embodiment, the period from 9:00 AM today to 9:00 AM tomorrow). The predicted energy consumption is stored in the predicted amount storage area 35g.

In Step S104, the first decision unit 36b calculates a product of the unit price and the predicted energy consumption for each hour with the cheapest unit price information stored in the cheapest unit price storage area 35f and information about the predicted energy consumption stored in the predicted amount storage area 35g. As a result, a table of the predicted hourly energy cost such as shown in FIG. 8 is created. The table of the hourly predicted energy cost is stored in the predicted cost storage area 35h.

In Step S105, the first decision unit 36b decides on a first time slot in which the energy unit costs reaches it peak in a predetermined period (first period) between 9:00 AM today and 9:00 AM tomorrow. The cheapest unit price information stored in the cheapest unit price storage area 35f is used for the decision. The decided starting time and ending time of the first time slot are stored in the time slot storage area 35d. In Step S105, the predicted energy cost stored in the predicted cost storage area 35h can be used for the decision of the first time slot instead of energy unit prices. In cases where candidate time slots are decided by using the energy unit price, Step S103 and Step S104 is not required for the decision process of the time slot.

In Step S106, the second decision unit 36c decides on a second time slot preceding the first time slot and a third time slot following the first time slot in the predetermined period. The decided starting and ending times of the second and third time slots are stored in the time slot storage area 35d.

FIG. 12 shall be discussed next.

In Step S111, the adjustment control unit 36d determines to which type of the time slot the current time slot corresponds among the first to third time slots using the current time presented by the time management unit 34 and the information stored in the time slot storage area 35d.

For example, in a case where the current time from the time management unit 34 is 13:00 and the information in FIG. 10 is stored in the slot storage area 35d, the adjustment control unit 36d which has read out the information in FIG. 10 determines that the current time corresponds to the first time slot.

In Step 112, the adjustment control unit 36d reads out the maximum permissible operating capacity which corresponds to the type of the time slot determined in Step S111 from the intensity storage area 35b and starts the energy adjustment control in accordance with this. At this time, the type of the time slot determined in Step S111, the maximum permissible operating capacity corresponding to that type of time slot, and the starting time of the energy adjustment control are stored in the control information storage area 35e.

For example, in a case where the current time is 13:00 and the information in FIG. 4 is stored in the intensity storage area 35b, the adjustment control unit 36d starts the energy adjustment control at a maximum permissible operating capacity of 40%. At this time, information that the time slot determined by the adjustment control unit 36d is the first time slot, the value of 40% for the maximum permissible operating capacity, and the energy adjustment control starting time of 13:00, are stored in the control information storage area 35e.

In Step S113, the adjustment control unit 36d determines whether the current energy adjustment control should be continued by using the current time from the time management unit 34.

In specific terms, the adjustment control unit 36d compares the current time from the time management unit 34 and the ending time of the time slot determined in Step S111, which is stored in the time slot storage area 35d. In cases where the current time has passed the ending time, the system goes to Step S114; otherwise, the system repeats Step S113 until passing the ending time.

In Step S114, the adjustment control unit 36d ends the current energy adjustment control. In specific terms, the adjustment control unit 36d commands the air conditioners 40, 40, . . . to cancel the setting of the maximum permissible operating capacity. Additionally, the ending time of the energy adjustment control, and information relating to the content of the energy adjustment control such as the actual energy consumption consumed during a series of times from Step S111 to Step 114 are stored in the control information storage area 35e. The actually consumed energy consumption is stored on the basis of the data stored in the operating condition storage area 35a. After the information has been stored in the control information storage area 35e, the system returns to Step S111.

(4) Characteristics (4-1)

In the present embodiment, the control device 30 for controlling the facility equipment comprises the communication unit 31, the first decision unit 36b, the second decision unit 36c, and the adjustment control unit 36d. The communication unit 31 receives time-of-use unit price information of the energy supplied to the facility equipment. The first decision unit 36b decides on a first time slot in which an index that includes a factor of the energy unit price approaches to its peak in a first period on the basis of the unit price information. The second decision unit 36c decides on a second time slot prior to the first time slot and a third time slot subsequent to the first time slot in the first period. The adjustment control unit 36d executes energy adjustment control to adjust the energy consumption of the facility equipment so that the intensity of suppression of the energy consumption is higher in the first time slot than in the second and the third time slot.

Herein, the predetermined first period is separated into at least three types of time slots, i.e., a first time slot (a time slot in which an index that includes a factor of the energy unit price approaches to its peak), a second time slot (a time slot prior to the first time slot), and a third time slot (a time slot subsequent to the first time slot). Among these three types of time slots, the energy consumption is suppressed most in the first time slot. Since the energy consumption is not suppressed in the other time slots as strongly as in the first time slot, comfort is hardly impaired even when the energy consumption is strongly suppressed in the first time slot.

(4-2)

In the present embodiment, the adjustment control unit 36d executes the energy adjustment control to adjust the energy consumption of the facility equipment so that the intensity of the suppression of the energy consumption in the third time slot is equal to or lower than the intensity of the suppression of the energy consumption in the first time slot, and the intensity of the suppression of the energy consumption is lower in the second time slot than in the third time slot.

In the second time slot, the energy consumption is suppressed at the lowest intensity among the three types of time slots. Thus it is highly likely that a certain level of comfort is maintained when the first time slot starts. As a result, the comfort is hardly impaired even if the energy consumption is strongly suppressed in the first time slot. Furthermore, since the energy adjustment control is executed in the third time slot at an intensity equal to or less than the intensity of the first time slot, flexible energy adjustment control is accomplished according to the degree of comfort of the user.

(4-3)

In the present embodiment, the prediction unit 36f predicts the energy consumption. The first decision unit 36b can use a product of the predicted energy consumption and the energy unit price as the index for deciding the first time slot.

By doing this, the time slot when the index calculated as the product of the predicted energy consumption and the energy unit price approaches to its peak, i.e., the time slot when the predicted energy cost approaches its peak, is decided as the first time slot. Thus, the energy adjustment control is executed strongly in the time slot in which the energy cost is predicted to be highest.

(4-4)

In the present embodiment, the communication unit 31 receives unit price information from multiple power companies for a period of time. The first decision unit 36h determines a time-of-use cheapest energy unit price on the basis of the plurality of items of unit price information for the period of time. The first decision unit 36b decides on a first time slot based on the cheapest energy unit price created as a result.

Here, by selecting the power supply company that offers the cheapest price, facilities may be run at the highest economic efficiency.

(5) MODIFICATION EXAMPLES (5-1) Modification Example 1A

The method for delivering the unit price information from the management device 10 of the power supplying company is not limited to that mentioned above. For example, a method in which the unit price information is delivered by fax over phone lines would also be acceptable. In this case, the control device 30 would receive the unit price information contained in the faxed document, by the input of the user through the input unit 33.

(5-2) Modification Example 1B

The intensity storage area 35b may store values such as the maximum permissible energy consumption, the permissible amounts of energy adjustment, the permissible numbers of air conditioners 40, 40 . . . in utilization, and the like, instead of, or in addition to, the maximum permissible operating capacity for different types of time slot. Examples of information stored in the intensity storage area 35b are shown in FIG. 13 (*a*) to (*c*).

(5-3) Modification Example 1C

In cases where it is obvious that the comfort cannot be assured at high probability, the adjustment control unit 36d need not execute the selected energy adjustment control. For example, the energy adjustment control need not be executed in cases where measured current temperature or humidity does not reach its set value and diverges from the set value by a predetermined extent or more. Alternatively, the instruction of the energy adjustment control need not be executed for a predetermined time subsequent to the start of operation, for example.

(5-4) Modification Example 1D

Energy adjustment control need not be executed in the second time slot. Specifically, the maximum permissible operating capacity may be set to 100% for the second time slot. By not executing energy adjustment control in the second time slot, comfort of the user during the first time slot is more easily maintained.

(5-5) Modification Example 1E

The first decision unit 36b may decide a plurality of first time slots in a predetermined period. In this instance, the second decision unit 36c may decide a plurality of second time slots and third time slots.

In specific terms, for example, in cases where n number of time slots in which the energy unit price reaches its maximum exist in a predetermined period, the first decision unit 36b decides each of n number of time slots in which the energy unit price reaches its maximum is the first time slots. Next, the second decision unit decides a time slot prior to the first one of the first time slots as a second time slot and decides a time slots subsequent to the nth one of the first time slots as a third time slot. Thereafter, the time between the first one of the first time slots and the second one of the first time slots is equally divided and the first half is decided as a third time slot and the latter half is decided as a second time slot. Further, a second first time slot and a third first time slot is decided in a similar way with respect to the time between the second one of the first time slots and the third one of the first time slots. Similar decisions are repeated (n−1) times.

By setting up a plurality of first to third time slots, the balance between the suppression of the energy consumption and the comfort of the the user can be achieved scrupulously.

The method for deciding a third and a second time slot between two first time slots is not limited to that mentioned above. For example, between two first time slots, the time before the energy unit price reaches its minimum may be decided as the third time slot and the time thereafter may be decided as the second time slot.

(5-6) Modification Example 1F

In the present embodiment, the entirety of the predetermined period (1 day) is divided into first to third time slots. However, it would be acceptable that only part of the predetermined period (1 day) is divided into first to third time slots.

For example, during the predetermined period, it would be acceptable to decide a time slot in which the energy unit price reaches its maximum as the first time slot, the two hours immediately preceding the first time slot as the second time slot, and the two hours immediately following the first time slot as the third time slot.

(5-7) Modification Example 1G

Air conditioner 40, 40, . . . is an example of facility equipment. For example, lightings and fans may be controlled by the control device 30. In so doing, the present control device can be applied to a wide range of facilities.

(5-7) Modification Example 1H

The control device 30 need not execute the energy adjustment control to all of the facility equipment in the premise, and it would be acceptable that the energy adjustment control is executed for only a portion thereof. Additionally, different energy adjustment control may be executed respectively for different types of facility equipment or different floors of the premise.

Second Embodiment

Figure 14:
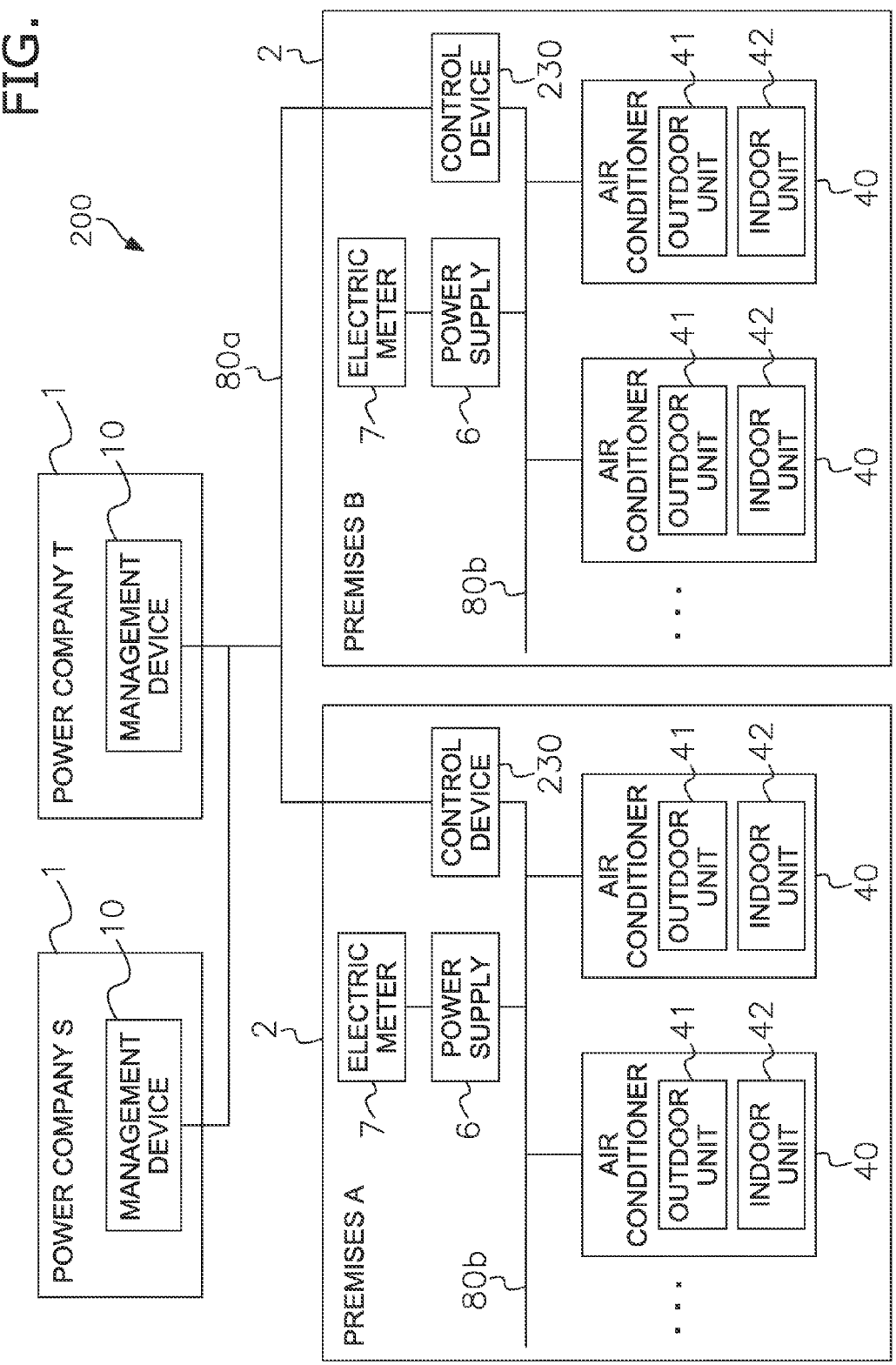
FIG. 14 is a simplified schematic diagram of the entirety of the system according to the second embodiment.

Next, an energy management system 200 according to a second embodiment of the present invention shall be described (see FIG. 14). The energy management system 200 according to the second embodiment is comparable to the energy management system 100 according to the first embodiment, with the exception of the configuration of the control devices 230, 230. Consequently, only the differences from the first embodiment, i.e., the configuration of the control devices 230 and the control processes performed in the energy management system 200, shall be described.

(1) CONFIGURATIONS OF UNITS
(1-1) Configuration of Control Device 230

A simplified schematic diagram of the control device 230 is shown in FIG. 15. While the control device 230 situated at premise A shall be described below, the configuration of the control device 230 situated at premise B is comparable in configuration.

The control device 230 has a communication unit 231, an output unit 232, an input unit 233, a time management unit 234, a storage unit 235, and a control unit 236. Here, the communication unit 231 and the time management unit 234 are respectively similar in configuration to the communication unit 31 and the time management unit 34 according to the first embodiment. Consequently, only the output unit 232, the input unit 233, the storage unit 235, and the control unit 236 shall be described.

(1-1-1) Output Unit 232

The output unit 232 mainly includes a display. Like the output unit 32 of the first embodiment, the output unit 232 displays screen images showing the operational status of the air conditioners 40, 40, . . . (for example, ON/OFF status of the air conditioners, operating mode (cooling mode/heating mode)), airflow direction, air volume, intake temperature, and set temperature). Also displayed are a plurality of possible amounts of energy consumption adjustment which are calculated based on a plurality of conditions by an after-mentioned energy calculation unit 236g. Furthermore, predicted energy consumption and predicted energy cost which are stored in a predicted amount storage area 235g and a predicted unit price storage area 235h, and/or actual energy consumption in each of the time slots which is stored in an operating condition storage area 235e, are displayed as well.

(1-1-2) Input Unit 233

The input unit 233 mainly includes operation buttons and a touch panel covering the aforementioned display. Like the input unit 33 according to the first embodiment, various commands to the air conditioners 40, 40, . . . , such as start-stop signals, changes of set temperature, changes of operating mode, and the like, are input from the user to the air conditioners 40, 40, . . . . The input unit 233 also receives input of a selection criterion from the user. This selection criterion is a criterion by which an adjustment control unit 236d decides on a single parameter for deciding the content of the energy adjustment control from among a plurality of alternatives. In other words, based on the selection criterion input by the user, the adjustment control unit 236d decides on a single condition corresponding to the energy adjustment control that will be actually executed from among a plurality of conditions for deciding the content of the energy adjustment control.

(1-1-3) Storage Unit 235

The storage unit 235 mainly includes a hard disk. Programs capable of being loaded and executed by the after-mentioned control unit 236 are stored in the storage unit 235. The storage unit 235 primarily has an operating condition storage area 235a, an intensity storage area 235b, a unit price storage area 235c, the time slot storage area 235d, the control information storage area 235e, a cheapest unit price storage area 235f, the predicted amount storage area 235g, the predicted cost storage area 235h, and a selected condition storage area 235i. The areas 235a, 235c, 235d, 235e, 235f, 235g, and 235h are respectively similar in configuration to the areas 35a, 35c, 35d, 35e, 35f, 35g, and 35h in the first embodiment. Consequently, only the intensity storage area 235b and the selected condition storage area 235i shall be described below.

(1-1-3-1) Intensity Storage Area 235b

In the second embodiment, the intensity storage area 235b stores intensity of the energy adjustment control for each of a plurality of different conditions and each of different types of time slot (first to third slots). In more specific terms, in the present embodiment, degree of suppression of the energy adjustment control (for example, three levels of low, medium, and high) is set as the plurality of conditions, and different intensity are specified for the different conditions and for the different types of time slot. FIG. 16 shows an example of intensity of the energy adjustment control for each of a plurality of conditions, stored in an intensity storage area 235b.

In other embodiments, the number of levels of the conditions which are the degrees of suppression of the energy adjustment control need not be three. Moreover, the condition is not limited to the degree of suppression of the energy adjustment control. For example, the condition may be levels of comfort of the user (for example, very comfortable, comfortable, moderately comfortable, and the like). The values stored in the intensity storage area 235b may be fixed values that are stored in the intensity storage area 235b in advance, or values that are updateable by input of a user through the input unit 233. Alternatively, appropriate numerical values may be updated on the basis of, for example, past operating conditions, predicted power consumption, predicted energy cost, environmental conditions, facility utilization conditions, length of each time slot, and the like, "Past operating conditions" refers to, for example, indoor temperature, humidity, lighting intensity, ventilation volume, and the like of the past. "Environmental conditions" refers to, for example, weather, outdoor temperature, brightness, and the like. "Facility utilization conditions" refers to, for example, ON/OFF status of the facility, the energy consumption, and the like.

(1-1-3-2) Selected Condition Storage Area 235*i*

The selected condition storage area 235*i* stores a single condition that was decided by the adjustment control unit 236*d* in the manner discussed below, together with the maximum permissible operating capacity for the first to third time slots which corresponds to the decided condition.

(1-1-4) Control Unit 236

The control unit 236 mainly includes a CPU, ROM, and RAM. By loading and executing a program stored in the aforementioned storage unit 235, the control unit 236 functions primarily as an operating condition grasping unit 236*a*, the first decision unit 236*b*, the second decision unit 236*c*, the adjustment control unit 236*d*, a supplier company instruction unit 236*e*, a prediction unit 236*f*, and the energy calculation unit 236*g*, as shown in FIG. 15.

236*a*, 236*b*, 236*c*, 236*e*, and 236*f* are respectively comparable to 36*a*, 36*b*, 36*c*, 36*e*, and 36*f* in configuration. Consequently, only the adjustment control unit 236*d* and the energy calculation unit 236*g* shall be described below.

(1-1-4-1) Adjustment Control Unit 236*d*

The adjustment control unit 236*d* decides on a single condition for the energy adjustment control from a plurality of conditions in the intensity storage area 235*b* (in the present embodiment, levels of the degree of suppression of the energy adjustment control). The adjustment control unit 236*d* determines to which type of the time slots the current time corresponds among the first to third time slots on the basis of the current time from the time management unit 234 and the starting and ending times of the first to third time slots which are stored in the time slot storage area 235*c* and then executes the energy adjustment control in accordance with the single condition selected by itself.

In specific terms, the decision of the single condition for the energy adjustment control is carried out in the following manner.

Firstly, at about 9:00 AM, possible amounts of energy consumption adjustment which are calculated in accordance with conditions by the after-mentioned energy calculation unit 236*g* is output to the output unit 232. The user views this output, chooses a level corresponding to the condition for the energy adjustment control from among a number of levels of intensity of the mew adjustment control (for example, three levels of low, medium, and high), and inputs this to the input unit 233. The adjustment control unit 236*d* decides a single condition based on this input as the selection criterion.

Thereafter, the condition decided by the adjustment control unit 236*d* and information about the maximum permissible operating capacity for the first to third time slots stored in the intensity storage area 235*h*, which corresponds to the decided condition, are stored in the selected condition storage area 235*i*. For example, in case where the information in FIG. 16 is stored in the intensity storage area 235*b* and the user inputs the "medium" to the input unit 233 among three levels, a maximum permissible operating capacity of 20% for the first time slot, a maximum permissible operating capacity of 60% for the second time slot, and a maximum permissible operating capacity of 40% for the third time slot, would be stored in the selected condition storage area 235*i*.

The method by which the adjustment control unit 236*d* decides the condition is not limited to the aforementioned method. For example, a selection criterion once entered may be used repeatedly to decide the condition instead the user input a selection criterion every day. The adjustment control unit 236*d* may decide a single condition by a method such as the following, instead of, or in addition to, the input of a selection criterion by the user. For example, a single condition such that the calculated possible amount of energy consumption adjustment fails within a predetermined value range may be decided automatically by the adjustment control unit 236*d*. Alternatively, a single condition may be decided in consideration of factors such as past operating conditions stored in the operating condition storage area 235*a*; information relating to past energy adjustment control stored in the control information storage area 235*e*; predicted power consumption; predicted energy cost; environmental conditions; facility utilization conditions; length of each time slot, and the like.

Next, the method of the energy adjustment control executed by the adjustment control unit 236*d* shall be described in specific terms.

The adjustment control unit 236*d* determines to which type of the time slot the current time corresponds among the first to third time slots on the basis of the current time from the time management unit 234 and the starting and ending times of the first to third time slots stored in the time slot storage area 235*c*. Then, the adjustment control unit 236*d* executes the energy adjustment control with the maximum permissible operating capacity stored in the selected condition storage area 235*i* until the ending time of the determined time slot. The intensity of energy adjustment control stored in the selected condition storage area 235*i* satisfies the following relationship: intensity of the first time slot≥intensity of the third time slot>intensity of the second time slot.

(1-1-4-2) Energy Calculation Unit 236*g*

The energy calculation unit 236*g* calculates possible amounts of energy consumption adjustment when the energy adjustment control is executed based on the conditions by using the information stored in the predicted amount storage area 235*g* and in the intensity storage area 235*b*. In the present embodiment, the calculation by the energy calculation unit 236*g* is carried out at about 9:00, after the predicted energy consumption is calculated by the prediction unit 236*f*.

The method for calculating the possible amounts of energy consumption adjustment for a one-day period (from 9:00 AM to 9:00 tomorrow) shall be described in specific terms.

Firstly, calculation of the possible amounts of energy consumption adjustment for the period from 9:00 AM to 10:00 AM shall be described.

The energy calculation unit 236*g* reads out the predicted energy consumption for the period from 9:00 AM to 10:00 AM from the predicted amount storage area 235*g*. As mentioned above, the predicted energy consumption represents the actual value of the same time on the previous day.

Meanwhile, the energy calculation unit 236*g* determines to which the period from 9:00 AM to 10:00 AM corresponds among the first to third time slots on the basis of the information stored in the time slot storage unit 235*d*. Furthermore, the maximum permissible operating capacities corresponding to the type of time slot determined thereby are read out from the intensity storage area 235*b*, and the maximum energy consumptions in case where operation is executed for one hour at that maximum permissible operating capacities based on the conditions.

Finally, the maximum energy consumptions are subtracted from the predicted amount of energy consumptions and the possible amounts of energy consumption adjustment for the period from 9:00 AM to 10:00 AM are calculated based on the conditions.

For example, it is assumed that the predicted energy consumption in the period from 9:00 AM to 10:00 AM by the air conditioners 40, 40 . . . of rated power of 100 kW (primarily the compressors) is 90 kWh and this value is stored in the predicted amount storage area 235*g*. Also it is assumed that the time slot of the period from 9:00 AM to 10:00 AM is stored as the second time slot in the time slot storage area 235*d*. In this case, if the information in FIG. 16 is stored in the intensity storage area 235*b*, the maximum permissible operating capacities for the second time slot are specified as 80%, 60%, and 40% for each of the conditions (for each of the levels of low, medium, and high of the degree of intensity of the energy adjustment control). Therefore, the maximum energy consumptions when the operation is executed for one hour based on the conditions are 80 kWh, 60 kWh, and 40 kWh respectively for levels of low, middle, and high. When these maximum energy consumptions are respectively subtracted from the predicted energy consumption of 90 kWh, possible amounts of energy consumption adjustment for this one-hour period are calculated to be 10 kWh, 30 kWh, and 50 kWh based on the conditions as shown in FIG. 17.

Comparable calculations are executed repeatedly for the period from 10:00 to 11:00, the period from 11:00 to 12:00, and so on until 9:00 AM tomorrow. The values of the differences calculated in this way are integrated for each of the conditions to calculate the possible amounts of energy consumption adjustment for each of the conditions.

(2) CONTROL PROCESSES PERFORMED IN THE ENERGY MANAGEMENT SYSTEM 200

Figures 17, 18:
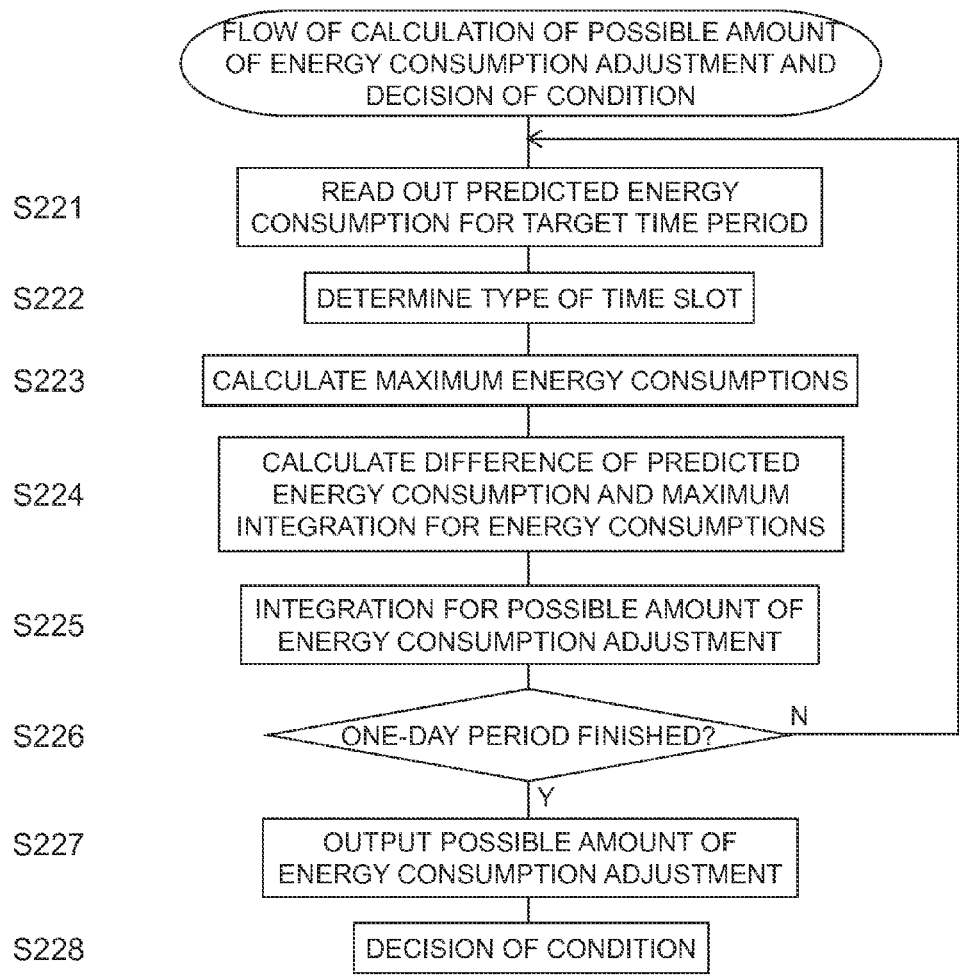
FIG. 17 is an example of the course of calculation of possible amounts of energy consumption adjustment according to the second embodiment.
FIG. 18 is a flowchart showing the flow of the calculation of possible amounts of energy consumption adjustment and the decision about a single condition in the control device according to the second embodiment.
Figure 19:
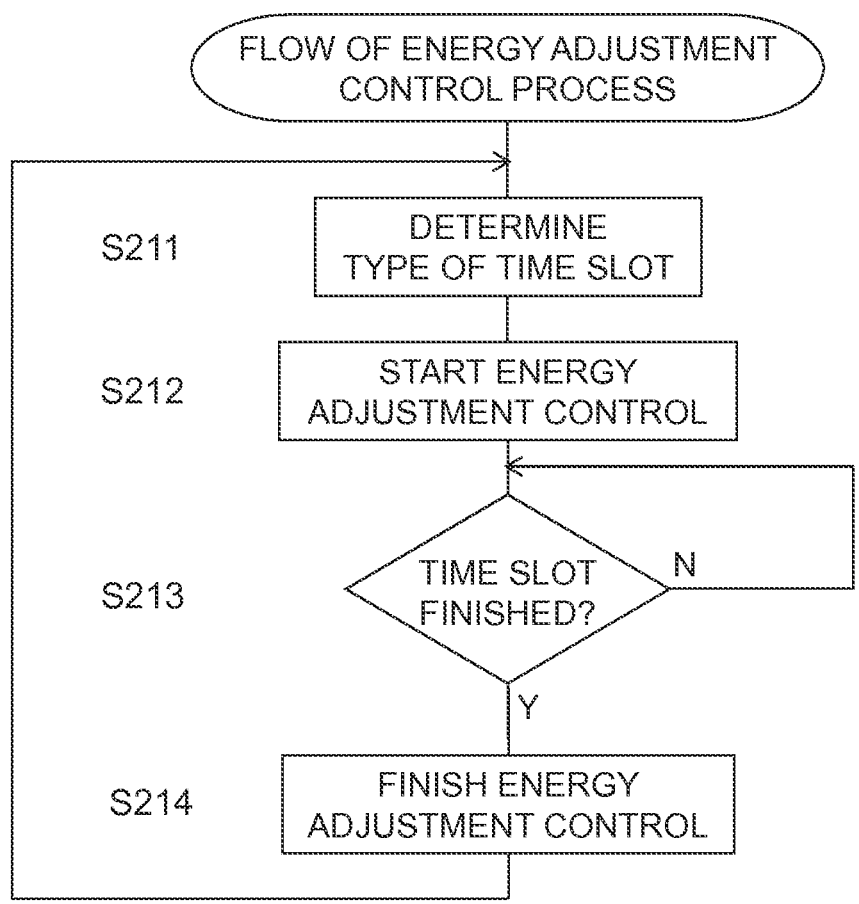
FIG. 19 is a flowchart showing the flow of the energy adjustment control process in the control device according to the second embodiment.

FIG. 18 is a flowchart showing the flow of the process for the calculation of possible amounts of energy consumption adjustment and the decision of the condition. FIG. 19 is a flowchart showing the flow of the energy adjustment control process in the control device 230 for controlling the air conditioners 40, 40, . . . . The flow of the processes in the control device 230 shall be described below with reference to FIGS. 18 and 19. The flowchart showing the flow of the decision as to the type of time slot is comparable to that in FIG. 11 of the first embodiment, and therefore description is omitted here.

First, FIG. 18 shall be described.

In the present embodiment, Step S221 is executed at about 9:00 AM, after the time slot is decided according to the flowchart of FIG. 11. As will be discussed below, the predicted energy consumption is used in the calculation of the possible amounts of energy control adjustment. Therefore Step S103 is required. In Step S221, the energy calculation unit 236*g* reads out the data pertaining to the predicted energy consumption for a one-hour period (in the present embodiment, firstly, the one hour from 9:00 AM to 10:00 AM) from the predicted amount storage area 235*g*.

In Step S222, the time period for which the predicted energy consumption has been read out in Step S221 is determined to which type of time slots among the first to third time slots. In specific terms, the energy calculation unit 236*g* refers to the time slot storage area 235*d*, and determines to which type of the time period for which information has been read out in Step S221 (for example, the time period from 9:00 AM to 10:00 AM) corresponds among the first to third time slots.

In Step S223, the energy calculation unit 236*g* reads out the maximum permissible operating capacity corresponding to the type of time slot determined in Step S222 from the intensity storage unit 235*b*, and calculates the maximum energy consumption based on the conditions, in case where operation is executed continuously for one hour at the maximum permissible operating capacity.

In Step S224, the maximum energy consumptions calculated in Step S223 are subtracted from the predicted energy consumptions read out in Step S221.

In Step S225, the result of the calculation in Step S224 is added to variables Sn prepared for each of the conditions (when the number of the conditions is three, S1, S2 and S3).

In Step S226, it is determined whether calculation is already executed for a one-day period (i.e., 24 times). In cases where the process is not yet been carried out for a one-day period, the system returns to Step S221 again, and the process from Step S221 to Step S225 is repeated for the next one-hour period (for example, in a case where the process for 9:00 AM to 10:00 AM has ended, for the period from 10:00 AM to 11:00 AM). In cases where the process for a one-day period has ended, the system advances to Step S227.

In Step S227, the variables Sn calculated based on the conditions by the energy calculation unit 236*g* is output to the output unit 232 as possible amounts of energy consumption adjustment.

In Step S228, a single condition is decided from among the plurality of conditions used by the adjustment control unit 236*d* for calculating possible amounts of energy adjustment. In the present embodiment, the user choose a single condition as a selection criterion based on the output in Step S227 and inputs this to the input unit 233, whereupon the adjustment control unit 236*d* decides on the single condition as it is entered. After the one condition is decided, the values of Sn are reset.

In the present embodiment, the user decides the condition directly, but in an alternative embodiment, the user may input the indirect selection criterion to the input unit 233. For example, the user may input to the input unit 233 a selection criterion that establishes a trend of the energy adjustment control, such as one prioritizing comfort, one prioritizing energy savings, or the like; or for example, numeral condition that possible amounts of energy consumption adjustment need satisfy may be input to the input unit 233. It is not necessary for the user to input a selection criterion every day, and the adjustment control unit 236*d* may decide on a single condition repeatedly based on a selection criterion that has been input once.

The condition decided by the energy calculation unit 236*g* and the maximum permissible operating capacities for the first to third time slots corresponding to the decided condition are stored in the selected condition storage area 235*i*.

Next, FIG. 19 shall be described.

Steps S211, S213, and S214 are the same as Steps S111, S113, and S114 respectively, and therefore only Step S212 shall be described.

In Step S212, the adjustment control unit 236*d* reads out the maximum permissible operating capacity corresponding to the time slot determined in Step S211 from the selected condition storage area 235*i* and starts the energy adjustment control based on that. At this time, the type of time slot determined in Step S211, the maximum permissible operating capacity corresponding to the type of time slot, and the starting time of the energy adjustment control are stored in the control information storage area 235*e*.

(3) CHARACTERISTICS (3-1)

In the present embodiment, the energy calculation unit 236*g*, which calculates possible amounts of energy consumption adjustment when the energy adjustment control is executed based on conditions, is further provided. The adjustment control unit 236d executes the energy adjustment control corresponding to the conditions.

Here, it is possible to execute the energy adjustment control after the possible amount of energy consumption adjustment is ascertained in advance.

(3-2)

Furthermore, in the present embodiment the input unit 233 is further provided. The input unit 233 receives input of a selection criterion by the user. The energy calculation unit 236g calculates the possible amounts of energy consumption adjustment based on a plurality of the conditions. The adjustment control unit 236d decides on a single condition from among the plurality of conditions and executes the energy adjustment control corresponding to the decided single condition.

Here, a plurality of the conditions are prepared, and the user participates in the selection of the condition of the energy adjustment control. As a result, the energy adjustment control which reflects the intention of the user is readily available.

(4) MODIFICATION EXAMPLE

The substances of the Modification examples 1A to 1F pertaining to the first embodiment are applicable to the second embodiment as well.

What is claimed is:

1. A control device for controlling facility equipment comprising:
  a receiving unit including a network interface, the receiving unit being configured to receive time-of-use unit price information of an energy to be supplied to the facility equipment during a predetermined period;
  a controller including a processor and a memory, the controller being programmed to include
    a first decision unit programmed to decide a first time slot in which an index that includes a factor of an energy unit price approaches a peak in the predetermined period based on the time-of-use unit price information;
    a second decision unit programmed to decide a second time slot prior to the first time slot and a third time slot subsequent to the first time slot in the predetermined period; and
    an adjustment control unit programmed to execute an energy adjustment control to adjust an energy consumption of the facility equipment so that
      an amount of suppression of the energy consumption in the third time slot is equal to or lower than an amount of the suppression of the energy consumption in the first time slot, and
      an amount of the suppression of the energy consumption in the second time slot is lower than the amount of the suppression of the energy consumption in the third time slot,
  the first decision unit being further configured to delay a starting time of the first time slot by a predetermined interval when the first time slot as decided would start at a starting time of the predetermined period, thereby lowering the amount of the suppression of the energy consumption at the starting time of the predetermined period.

2. The control device according to claim 1, wherein
the controller further includes a prediction unit programmed to predict the energy consumption in the predetermined period,
the first decision unit calculating a product of the energy consumption predicted by the prediction unit and the energy unit price as the index.

3. The control device according to claim 1, wherein
the adjustment control unit does not suppress the energy consumption in the second time slot.

4. The control device according to claim 1, wherein
the controller further includes an energy calculation unit programmed to calculate a possible amount of energy consumption adjustment when the energy adjustment control is executed based on at least one condition,
the adjustment control unit executing the energy adjustment control corresponding to the condition.

5. The control device according to claim 4, further comprising
an input unit configured to receive input of a selection criterion by a user;
the energy calculation unit calculating the possible amount of energy consumption adjustment based on a plurality of conditions; and
the adjustment control unit deciding a single condition of the plurality of conditions based on the selection criterion and executing the energy adjustment control corresponding to the single condition decided.

6. The control device according to claim 2, wherein
the adjustment control unit does not suppress the energy consumption in the second time slot.

7. The control device according to claim 2, wherein
the controller further includes an energy calculation unit programmed to calculate a possible amount of energy consumption adjustment when the energy adjustment control is executed based on at least one condition,
the adjustment control unit executing the energy adjustment control corresponding to the condition.

8. The control device according to claim 2, wherein
the receiving unit receives a plurality of different items of the time-of-use unit price information for a period of time; and
the first decision unit is programmed to determine a cheapest time-of-use energy unit price based on the plurality of items of the time-of-use unit price information for the period of time and decides the first time slot based on the index, and the index includes a factor of the cheapest time-of-use energy unit price.

9. The control device according to claim 3, wherein
the controller further includes an energy calculation unit programmed to calculate a possible amount of energy consumption adjustment when the energy adjustment control is executed based on at least one condition,
the adjustment control unit executing the energy adjustment control corresponding to the condition.

10. The control device according to claim 3, wherein
the receiving unit receives a plurality of different items of the time-of-use unit price information for a period of time; and
the first decision unit is programmed to determine a cheapest time-of-use energy unit price based on the plurality of items of the time-of-use unit price information for the period of time and decides the first time slot based on the index, and the index includes a factor of the cheapest time-of-use energy unit price.

11. The control device according to claim 4, wherein
the receiving unit receives a plurality of different items of the time-of-use unit price information for a period of time; and
the first decision unit is programmed to determine a cheapest time-of-use energy unit price based on the plurality of items of the time-of-use unit price information for the period of time and decides the first time slot based on the index, and the index includes a factor of the cheapest time-of-use energy unit price.

12. A control device for controlling facility equipment comprising:
a receiving unit including a network interface, the receiving unit being configured to receive a plurality of items of time-of-use unit price information regarding energy to be supplied to the facility equipment during a predetermined period, each of the items of time-of-use unit price information being received from a different power company;
a controller including a processor and a memory, the controller being programmed to include
a first decision unit programmed to determine a cheapest time-of-use energy unit price based on the plurality of items of time-of-use unit price information for the period of time and decide a first time slot in which an index approaches a peak in the predetermined, period, the index including a factor of the cheapest time-of-use energy unit price;
a second decision unit programmed to decide a second time slot prior to the first time slot and a third tune slot subsequent to the first tune slot in the predetermined period; and
an adjustment control unit programmed to execute an energy adjustment control to adjust an energy consumption of the facility equipment so that an amount of suppression of the energy consumption is higher in the first time slat than in the second and the third time slots,
the first decision unit being further configured to delay a starting time of the first time slot by a predetermined interval when the first time slot as decided would start at a starting time of the predetermined period, thereby lowering the amount of the suppression of the energy consumption at the starting time of the predetermined period.

\* \* \* \* \*

UNITED STATES PATENT AND TRADEMARK OFFICE
CERTIFICATE OF CORRECTION

PATENT NO. : 9,964,930 B2
APPLICATION NO. : 14/128171
DATED : May 8, 2018
INVENTOR(S) : Seiji Kawai It is certified that error appears in the above-identified patent and that said Letters Patent is hereby corrected as shown below:

In the Claims

Claim 12 in Column 26, Line 4:
"mined, period, the index including a factor of the"
Should read:
-- mined period, the index including a factor of the --

Claim 12 in Column 26, Line 14:
"in the first time slat than in the second and the third"
Should read:
-- in the first time slot than in the second and the third --

Signed and Sealed this
Twenty-fifth Day of September, 2018

Andrei Iancu
*Director of the United States Patent and Trademark Office*